US 12,485,948 B2

(12) United States Patent
Holleis (10) Patent No.: US 12,485,948 B2
(45) Date of Patent: Dec. 2, 2025

(54) STROLLER FRAME AND STROLLER (71) Applicant: CYBEX GmbH, Bayreuth (DE)

(72) Inventor: Ralf Holleis, Bayreuth (DE)

(73) Assignee: CYBEX GmbH, Bayreuth (DE)

( * ) Notice: Subject to any disclaimer, the term of this patent is extended or adjusted under 35 U.S.C. 154(b) by 914 days.

(21) Appl. No.: 17/593,260

(22) PCT Filed: Mar. 9, 2020

(86) PCT No.: PCT/EP2020/056180
§ 371 (c)(1),
(2) Date: Sep. 14, 2021

(87) PCT Pub. No.: WO2020/182715
PCT Pub. Date: Sep. 17, 2020

(65) Prior Publication Data
US 2022/0153333 A1 May 19, 2022

(30) Foreign Application Priority Data
Mar. 14, 2019 (DE) ...................... 20 2019 101 456.3

(51) Int. Cl.
*B62B 9/10* (2006.01)
*B62B 7/04* (2006.01)
*B62B 9/08* (2006.01)
(52) U.S. Cl.
CPC .................. *B62B 9/10* (2013.01); *B62B 7/04* (2013.01); *B62B 9/087* (2013.01)
(58) Field of Classification Search
CPC .............. B62B 9/10; B62B 7/04; B62B 9/087
See application file for complete search history.

(56) References Cited

U.S. PATENT DOCUMENTS 5,370,408 A * 12/1994 Eagan .................. B62B 5/0438
280/47.38
5,937,961 A * 8/1999 Davidson .................. B62B 9/00
180/166

(Continued)

FOREIGN PATENT DOCUMENTS

CN 1706517 A 12/2005
CN 104220135 A 12/2014

(Continued)

OTHER PUBLICATIONS

"International Application No. PCT/EP2020/056180, International Search Report and Written Opinion mailed Jun. 8, 2020", (Jun. 8, 2020), 12 pgs.

(Continued)

*Primary Examiner* — Valentin Neacsu
*Assistant Examiner* — Michael R Stabley
(74) *Attorney, Agent, or Firm* — Schwegman Lundberg & Woessner, P.A.

(57) ABSTRACT

Stroller frame comprising at least one electric motor, for assistively driving the stroller frame, at least one wheel connecting device, in particular wheel axle, and at least one battery module connected or connectable to the wheel connecting device, which in the assembled state is arranged at least partly outside the wheel connecting device and is arranged at least predominantly below a level of an upper end of the wheel connecting device or is arranged at least partly below the wheel connecting device.

12 Claims, 3 Drawing Sheets

(56) References Cited

U.S. PATENT DOCUMENTS

| | | | |
|---|---|---|---|
| 6,148,942 A | 11/2000 | Mackert, Sr. | |
| 6,360,836 B1* | 3/2002 | Milano, Jr. | B62B 5/0046 |
| | | | 280/47.38 |
| 8,033,348 B1* | 10/2011 | Parkhe | B62B 9/085 |
| | | | 180/19.1 |
| 9,669,858 B2* | 6/2017 | Washington | B62B 9/005 |
| 9,738,300 B2* | 8/2017 | Georgiev | B62B 9/00 |
| 9,796,401 B1 | 10/2017 | Ammirati et al. | |
| 10,953,905 B2* | 3/2021 | Tse | B62B 5/005 |
| 2017/0166278 A1 | 6/2017 | Lu | |
| 2018/0208226 A1 | 7/2018 | Tse | |
| 2019/0160937 A1* | 5/2019 | Yilma | B60K 7/0007 |

FOREIGN PATENT DOCUMENTS

| | | |
|---|---|---|
| CN | 104973108 A | 10/2015 |
| CN | 204713183 U | 10/2015 |
| CN | 105313939 A | 2/2016 |
| CN | 205524417 U | 8/2016 |
| CN | 206155520 U | 5/2017 |
| CN | 107953958 A | 4/2018 |
| CN | 108839699 A | 11/2018 |
| CN | 109278842 A | 1/2019 |
| EP | 2019016 B1 | 5/2011 |
| EP | 2332806 A2 | 6/2011 |
| JP | S476591 Y1 | 3/1972 |
| JP | H2115089 U | 9/1990 |
| KR | 20100074462 A | 7/2010 |
| WO | WO-2017042957 A1 | 3/2017 |
| WO | WO-2018022080 A1 | 2/2018 |
| WO | WO-2020182715 A1 | 9/2020 |

OTHER PUBLICATIONS

"Chinese Application No. 202080035525.2, Notification of the First Office Action dated Sep. 19, 2023", (Sep. 19, 2023), 11 pgs.

"Chinese Application No. 202080035525.2, Search Report dated Sep. 14, 2023", (Sep. 14, 2023), 5 pgs.

"Japanese Application No. 2021-555493, Office Action mailed Nov. 21, 2023", with English translation, (Nov. 21, 2023), 15 pages.

"KR20217033101 Request for the Submission of an Opinion mailed Apr. 21, 2025", with English translation, 17 pages.

* cited by examiner

STROLLER FRAME AND STROLLER

PRIORITY CLAIM TO RELATED APPLICATIONS

This application is a U.S. national stage filing under 35 U.S.C. § 371 from International Application No. PCT/EP2020/056180, filed on 9 Mar. 2020, and published as WO2020/182715 on 17 Sep. 2020, which claims the benefit under 35 U.S.C. 119 to German Application No. 20 2019 101 456.3, filed on 14 Mar. 2019, the benefit of priority of each of which is claimed herein, and which applications and publication are hereby incorporated herein by reference in their entirety.

The invention relates to a motorized stroller frame and a corresponding stroller.

Motorized strollers are known in principle. These may be configured to be moved solely by motor power. Furthermore, it is in principle known to equip strollers with motor assistance which supports the driving force of a person operating the stroller, but does not provide assistance when no force is exerted by the operator.

From EP 2 019 016 B1 a stroller with an electric motor and a battery supplying it is known. In one embodiment, the battery is provided outside an axle, at each end of which a wheel is mounted. In another embodiment, the battery is integrated in a cavity of the axle. In an arrangement outside the axle, the battery is comparatively poorly protected. In an arrangement inside the axle, the battery is better protected, although other difficulties then arise, in particular with regard to a dimensioning, mounting and handling of the battery.

It is therefore the object of the invention to propose a stroller frame as well as a corresponding stroller which is simple and yet reliable in operation. In particular, it should be possible to use a battery required for an electric motor as simply as possible and without complications.

This task is solved in particular by a stroller frame according to claim 1.

In particular, the task is solved by a stroller frame comprising at least one electric motor, for preferably assistively driving the stroller frame, at least one wheel connecting device, in particular wheel connecting strut, preferably wheel axle, further preferably rear wheel axle, and at least one battery module connected or connectable to the wheel connecting device, which in the assembled state is arranged at least partly outside the wheel connecting device and at least partly, preferably predominantly, in particular completely, below an upper end of the wheel connecting device.

A first core aspect of the invention lies in the fact that the battery module (at least in the assembled state) is arranged at least partly outside the wheel connecting device, and at least partly, in particular predominantly, preferably completely, below an upper level of an upper end of the wheel connecting device. As a result, on the one hand the battery module can be reached comparatively easily, in particular be dismantled or replaced. Due to the comparatively deep arrangement, the battery module is preferably at least partially protected by the wheel connecting device provided anyway. In addition, due to the comparatively low center of gravity associated therewith a stable mounting of the battery or a stable configuration of the entire stroller (or stroller frame) is achieved. In a particularly simple manner, this enables simple yet reliable use of the battery in a simple manner, for example upon removal for charging or attachment after charging.

Specifically, the battery module is to be arranged at least predominantly below the level of the upper end of the wheel connecting device. By this is to be understood in particular that a center of gravity and/or an average height of the battery module is arranged below the level of the upper end of the wheel connecting device, in particular is by at least 0.5 cm, preferably at least 1 cm and/or by at least 10%, preferably at least 20% of below a height extension (as distance of a level of an upper end of the wheel connecting device from a level of a lower end thereof, or as (maximum) vertical extension of the respective element or the respective device; and in particular in the operating state of the stroller) of the wheel connecting device. By an average height is meant here and in the following, in particular, a height that lies halfway (in the vertical direction) between an upper end of the respective device or component and a lower end thereof. Preferably, a center of gravity of the battery module is below a level of a center of gravity of the wheel connecting device.

By a level of an upper end of the wheel connecting device is meant, in particular, a (horizontal) plane comprising the upper end of the wheel connecting device. This is to be understood by the highest point or points of the wheel connecting device (in the operating state). In the case of a common wheel axle, these highest points may form a line.

By an arrangement at least partly outside the wheel connecting device preferably an arrangement is to be understood in which the battery module in the assembled state is accessible from the outside or is visible partly. Preferably, in this sense at least 10%, further preferably at least 50%, of an external surface of the battery module (in an isolated view of the battery module) are exposed in this sense. Possibly, the battery module may be completely outside of the wheel connecting device, or at least by at least 30% by weight and/or at least 30% by volume, or at least 80% by weight and/or at least 80% by volume. Specifically, the battery module should not be located (at least not completely) inside the wheel connecting device, for example in a corresponding cylindrical cavity thereof. This would make the use of the battery module more difficult.

Alternatively, or in addition to the above arrangement below a level of the upper end of the wheel connecting device, the battery module should be arranged at least partly below (or directly below) the wheel connecting device. If the wheel connecting device is regarded as an "umbrella" and the region below the wheel connecting device is regarded as the region which is protected by the umbrella in the case of vertically falling water drops, the battery module is thus preferably located at least partly, further preferably predominantly, possibly completely or possibly not completely in this protected region. By an arrangement at least partly below the wheel connecting device it is to be understood in particular that at least a section of a projection surface of the battery module onto a horizontal plane overlaps with a corresponding projection surface of the wheel connecting device (onto the horizontal plane). In particular, at least 10%, preferably at least 30% and/or at most 90% of the projection surface of the battery module shall overlap with a corresponding projection surface of the wheel connecting device. Alternatively, or additionally, the corresponding portion of the battery module (constituting the overlapping projection surface) shall constitute at least 10% by weight and/or at least 10% by volume, preferably at least 30% by weight and/or at least 30% by volume and/or at most 90% by weight and/or at most 90% by volume of the entire battery module. In specific embodiments possibly at least portions of the battery are not arranged below the wheel connecting device in this sense, even though they may (but need not) be arranged below a level of the upper end of the wheel connecting device.

According to a further (possibly independent, but in particular combinable with one or more of the above and/or following aspects) aspect of the invention, a stroller frame, in particular as described above, is proposed, comprising at least one electric motor, for preferably assistively driving the stroller frame, at least one wheel connecting device, in particular wheel connecting strut, preferably wheel axle, further preferably rear wheel axle, and at least one battery module which is connected or can be connected to the wheel connecting device and in the assembled state is arranged at least partly outside the wheel connecting device and has a height and/or a maximum diameter (perpendicular to a longitudinal axis of the wheel connecting device) which is/are at most 1.5 times as great, preferably at most 1.0 times as great, as a height and/or a maximum diameter of the wheel connecting device. By a maximum diameter of the corresponding device or element is to be understood in particular the distance of that pair of points which, taking into account all cross-sections perpendicular to the (respective) longitudinal axis, has the greatest distance from one another. Overall, a simply usable and yet reliable power supply can be made possible.

A wheel connecting device is to be understood in particular as a device which connects two wheels of a pair of wheels to each other (preferably directly) and holds or supports them. Such a wheel connecting device is preferably arranged in the form of a (possibly at least in the operating state of the stroller substantially horizontally extending strut), possibly cylindrically (although not, at least not necessarily, circularly cylindrically). An (axial) length of such a wheel connecting device is preferably at least 5 times as long as a (maximum) diameter (as the largest distance of a pair of points in all cross-sections perpendicular to the axial length). In at least one state of the interconnected wheels, the wheel connecting device preferably lies entirely within a cylinder whose end faces are formed by the outer faces of the wheels.

The wheel connecting device preferably has a height extension (in the operating state) of less than 15 cm, further preferably less than 7 cm. Functionally and/or structurally independent units and/or elements, such as, for example, an actuating device and/or a motor or a motor housing and/or a brake are preferably not (but can be) considered to be part of the wheel connecting device. The wheel connecting device preferably extends at least over 80%, in particular over 90% of a distance, optionally an entire distance, of the wheels to be connected to each other.

In specific embodiments, the wheel connecting device may constitute or comprise a wheel strut or wheel axle, preferably rear wheel axle (alternatively front wheel axle). Alternatively, the wheel connecting device may be formed as or comprise a shaft. The wheels associated with the wheel connecting device are preferably driven by at least one electric motor (for example, a common electric motor or one electric motor each).

By a battery module is meant in particular a (structurally delimited or delimitable) module comprising at least one battery. In this context, a battery may comprise one or more galvanic cells. The battery is preferably an accumulator. The module is preferably defined by a housing delimiting the module from the outside. In embodiments, this housing is cylindrical (but not, at least not necessarily, circular-cylindrical, although this is possible). The battery module may have a weight of at least 100 g, preferably at least 400 g and/or at most 3 kg, preferably at most 700 g. The (maximum) capacity may be at least 10 Wh (0.28 Ah at 36 V), preferably at least 40 Wh (1.11 Ah at 36 V), and/or at most 400 Wh (11.1 Ah at 36 V), optionally at most 150 Wh (4.17 Ah at 36 V), for example 93.6 Wh (2.6 Ah at 36 V). Preferably, at least one or the at least one battery is (possibly in the case of several or all batteries provided) a lithium-ion battery and/or a 18650-type battery and/or a cylindrical cell, in particular a circular-cylindrical cell, and/or a prismatic cell and/or pouch cell.

The battery module preferably has a height extension (in the operating state) of less than 15 cm, further preferably less than 5 cm and/or more than 1 cm and/or a depth extension (extension in the direction of travel, in the operating state) of less than 20 cm, further preferably less than 7 cm and/or more than 2 cm. The battery module preferably extends at least over 50%, in particular at least over 65%, and/or at most 90% of a distance between the wheels to be connected to one another and/or of a longitudinal extension of the wheel connecting device. Possibly, the battery module can also extend over more than 70% or even 90% of this distance.

The battery module preferably extends (in a longitudinal extension; in the assembled state or in the operating state of the stroller/stroller frame) at least substantially parallel to a connecting line between the two wheels connected by the wheel connecting device, in particular parallel to a connecting line between respective centers of the two wheels to be connected, and/or at least substantially parallel to a longitudinal extension of the wheel connecting device and/or at least substantially horizontally.

By an assembled state, it is intended to be understood the state in which the battery module is mounted in the stroller frame (in particular in a correspondingly provided manner or on a battery receptacle and/or battery mounting structure provided therefor) in such a way that the electric motor can be supplied with power (insofar as corresponding settings, such as electric switches, are correspondingly actuated).

Preferably, wheel connecting device or battery module come into contact with one another (in particular over an area of at least 5 cm$^2$, preferably at least 10 cm$^2$, further preferably at least 50 cm$^2$) or are accordingly in direct connection or can at least be directly connected to each other.

The wheel connecting device may be a hollow profile or housing, or such may at least be encompassed by the wheel connecting device.

At least one drive, at least one electric motor, may be arranged on or adjacent to the wheel connecting device.

A vertical plane shall hereinafter (unless otherwise specified) be understood as a plane extending perpendicular to the horizontal and perpendicular to a direction of travel. A vertical plane referred to as a first vertical plane is preferably tangent to an outer, further preferably rear, end of the wheel connecting device. In this context, an outer end of the wheel connecting device is further away from a center (center of gravity) of the stroller frame or stroller than a corresponding inner end. In the case of a rear wheel strut or rear wheel axle, the outer end is then correspondingly a rear end (or an end pointing in the opposite direction to the direction of travel); in the case of a front wheel strut or front wheel axle, the outer end is correspondingly a front end. By an inner end is preferably meant that half-space which is bounded by the corresponding vertical plane and accommodates the center (the center of gravity) of the stroller frame or stroller.

Preferably, the battery model in the assembled state is arranged at least partly, in particular predominantly, preferably completely, on an inner side of the first vertical plane. Alternatively, or additionally, the battery module is arranged such that a projection thereof onto the first vertical plane overlaps at least in sections, preferably predominantly and/or non-completely, with a projection of the wheel connecting device onto the vertical plane. A predominant arrangement or overlapping is again intended to mean here that in particular at least 50% by weight or 50% by volume, preferably at least 70% by weight or 70% by volume of the battery module fulfills the respective condition. In general, it is possible that a projection of the center of gravity of the battery module onto the first vertical plane lies within or, alternatively, outside a projection of the wheel connecting device onto the vertical plane. Even with such an arrangement or configuration of the battery module, safe and reliable use is enabled.

Preferably, the battery module extends over at least half, more preferably over at least 80%, more preferably over 95% of an (axial) length of the wheel connecting device and/or a wheel distance of the wheels connected by the wheel connecting device. As a result, the battery module can in particular be comparatively effectively protected by the wheel connecting device and/or can be used comparatively without complications.

The above object is thus further (as an independent or optionally further-forming aspect, optionally with further of the above and/or following features and/or optionally without the features concerning the height arrangement of the battery module and/or the dimensioning thereof in the height direction and/or diameter) solved by a stroller frame, comprising at least one electric motor, for preferably assistively driving the stroller frame, at least one wheel connecting device, in particular wheel strut, preferably wheel axle, further preferably rear wheel axle, and at least one battery module connected or connectable to the wheel connecting device, which, in the assembled state, is preferably arranged at least partly outside the wheel connecting device, the battery module extending over at least half, preferably over at least 80%, further preferably over 95%, of a wheel spacing of the wheels connected by the wheel connecting device and/or of an (axial) length or longitudinal extension of the wheel connecting device.

The battery module or a housing thereof is preferably at least partly in (direct) physical (and/or electrical) contact with the wheel connecting device or a housing and/or outer wall thereof.

According to an embodiment, the battery module is removable from the wheel connecting device, in particular by means of a tool and/or, preferably, manually. For this purpose, for example, at least one manual actuating device, such as in particular a button, a knob, a pulling element and/or a lever, may be provided. This further simplifies the use of the battery module.

According to an embodiment, the battery module is designed without an electric motor and/or other drive elements, such as a gearbox (for at least assistively driving the stroller frame). As a result, the battery module can be designed to be comparatively small in size, which further simplifies its use.

Preferably, the battery module in the assembled state when viewed from at least one first angle is predominantly, in particular completely, covered by the wheel connecting device. The at least one first angle or at least one of possibly several (fulfilling this condition) first angles is preferably greater than 0°, further preferably greater than 20° and/or less than 90°, preferably less than 60° with respect to a horizontal plane (wherein in particular an oblique downward viewing direction is to be assumed). Alternatively, or additionally, the battery module is in the assembly state when viewed from at least a second angle predominantly not, in particular completely not, covered by the wheel connecting device. The second angle can correspond to the first angle rotated by 180° (here, however, in particular assuming an oblique-upward viewing direction). In such solutions, the battery module disappears (partially or completely) when viewed from an (usual) outside viewing perspective (especially from the rear, in the case of a person pushing the vehicle) in an oblique-downward direction. This makes it possible to achieve an attractive appearance and at the same time to protect the battery module from external influences (for example, the foot of the person pushing). It has been recognized that especially the foot of the operating person often comes into contact with the rear wheel strut or rear wheel axle from oblique-upwards, for example, in order to actuate a brake or to put the foot down.

Wheel connecting device and/or battery module preferably have (in each case) a flat (planar) side extending, for example, over at least 5 cm$^2$, preferably at least 10 cm$^2$, further preferably at least 50 cm$^2$ and/or at most 500 cm$^2$. In one embodiment, the wheel connecting device and battery module are (directly) connected to each other via their flat sides.

An edge portion of a cross-section of the wheel connecting device, which (in the assembled state) does not bear against the battery module, is preferably rounded (cornerless or edgeless), in particular at least approximately arcuate, preferably circular. Alternatively, or additionally, an edge portion of a cross-section of a battery module which (in the assembled state) does not bear against the wheel connecting device is preferably rounded, in particular at least approximately arcuate, optionally with rounded corner regions or without rounded corner regions. The cross sections addressed here are preferably cross sections perpendicular to a longitudinal axis of the wheel connecting device or of the battery module. The corresponding cross-section of the battery module can be approximately quadrangular, in particular rectangular or trapezoidal, with rounded corners in the region facing away from the wheel connecting device and/or non-rounded corners in the region facing the wheel connecting device. Overall, such a design with rounded corners (possibly rounded corner areas) can reduce a risk of damage. In addition, an attractive exterior with a quasi-invisible battery module is thereby achieved.

Outer surfaces of the wheel connecting devices of the battery module preferably (in the assembled state) merge at least partly at least substantially (flush or steplessly) into one another. Also by this it can be prevented that an object or body part gets caught or a corresponding risk can be reduced, so that the battery module is accommodated particularly safely.

In an embodiment, the battery module can be removed from the assembled state, whereby for that possibly (first) a locking device may have to be released. A positioning aid, preferably at least one stop, may be provided (in particular on the flat side, preferably on an edge of the flat side, of the wheel connecting device), in particular such that the correct position can be found intuitively when inserting the battery module.

The stroller frame preferably comprises an actuating device, in particular to be actuated by foot, for a brake, in particular a parking brake, which is preferably arranged at least partly, further preferably exclusively, on the wheel connecting device (contacting the latter) and/or not on the battery module (not contacting the latter). Particularly in the case of such a wheel connecting device with actuating device, the arrangement of the battery module according to the invention is particularly advantageous, since the battery module is then protected from corresponding "actuating kicks".

According to an embodiment, the stroller frame comprises at least one locking device, in particular a latching device, for connecting the wheel connecting device and the battery module to one another, in particular for latching them to one another.

The above-mentioned object is further solved by a stroller (for example, a children's stroller, buggy or similar vehicle for children), comprising a stroller frame of the above type. In addition to the stroller frame, the stroller may further comprise a receiving device for the child (for example, carrying bag and/or seat unit). This receiving device can be separate or separable from the stroller frame or (possibly inseparably) connected to the stroller frame.

Further embodiments derive from the dependent claims.

In the following, the invention is described by means of an exemplary embodiment, which is explained in more detail with reference to the figures. Hereby show.

In the following description, the same reference signs are used for the same and similarly acting parts.

Figure 1:
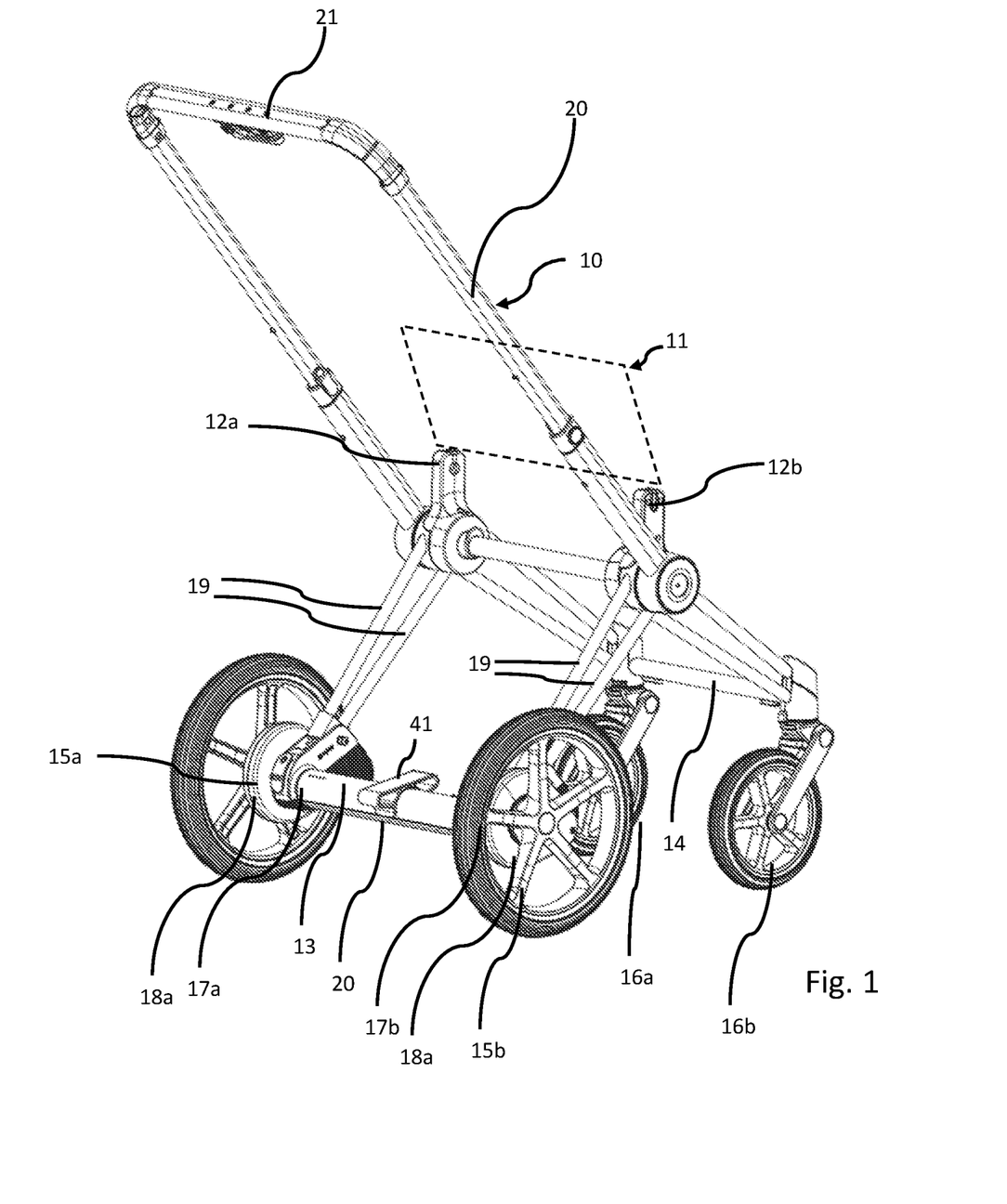
FIG. 1 an oblique view of a stroller frame according to the invention.

FIG. 1 shows a stroller (partly schematic) comprising a stroller frame 10 and a receiving device 11 (only schematically drawn as a placeholder, dashed), which is connected or connectable to the stroller frame 10 via holding devices 12a, 12b. The stroller frame 10 comprises a (first) wheel connecting device in the form of a rear wheel strut or rear wheel axle 13 and a (second) wheel connecting device in the form of a front wheel strut 14. For reasons of illustration, in particular the rear wheel axle 13 and parts associated with this rear wheel axle 13 are described further. In this regard, the corresponding explanations apply to any wheel connecting device in general (although in particular to the rear wheel axle 13 as an element connecting two rear wheels).

Specifically, the rear wheel axle 13 connects rear wheels 15a, 15b and the front wheel strut 14, front wheels 16a, 16b.

Electric motors 18a, 18b are arranged at ends 17a, 17b of rear wheel axle 13. These drive one of the wheels 15a and 15b, respectively. Furthermore, further (obliquely running) struts 19 are arranged at ends 17a, 17b, which are also components of the stroller frame 10 and will not be explained further below. These (obliquely extending) struts are not a component of the wheel connecting device or, specifically, of the rear wheel axle 13.

Further components of the stroller frame 10 are, in particular, a grab rail 20 with a grab handle 21 for pushing and/or pulling the stroller.

As can be seen in FIG. 1, the electric motors 18a, 18b are arranged outside the rear wheel axle 13. In particular, this idea (also in the case of only one electric motor or several electric motors) is to be understood detached from the specific embodiment (for example as further embodiment of one of the claims). Specifically, at least one electric motor 18a, 18b may be accommodated in a housing that is independent of the wheel connecting device and/or may be arranged at least partly, in particular completely, around the wheel connecting device or a housing thereof (for example over an angle of at least 180° or at least 270°).

Conceptually, the wheel connecting device (or, more specifically, the rear wheel axle 13) is intended to be an element configured to connect and retain a pair of wheels. Thus, further components, such as the electric motors 18a, 18b (and/or the actuating device for a parking brake and/or the battery module to be explained below) are not necessarily to be regarded as part of the wheel connecting device or rear wheel axle, even if they are arranged (possibly also directly) at and/or on the wheel connecting device.

In FIG. 1, a battery module 20 can be seen only to some extent. This battery module 20 is explained in detail with reference to the following figures.

Figure 2:
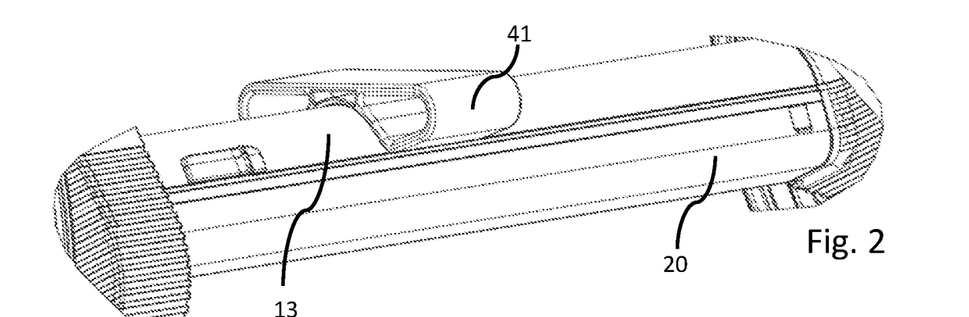
FIG. 2 a part of the embodiment according to FIG. 1 with a view of the rear axle with attached battery.

FIG. 2 shows a part of the embodiment according to FIG. 1 in a view of the rear wheel axle, viewed from an inner side of the first vertical plane (i.e. in this case from a direction of the front wheels). Also visible here (see also FIG. 1) is an actuating device 41 for a parking brake (not shown in detail) for locking at least one of the rear wheels 18a, 18b (or generally for locking the stroller). The actuating device 41 is arranged exclusively on the rear wheel axle 13 or not on the battery module 20. This prevents that the actuation device 41 makes the use of the battery module 20 more difficult.

The battery module 20 extends at least substantially over the entire (axial) length of the rear wheel axle 13 and/or over a major portion (at least 50%, preferably at least 65%) of a wheel distance between the wheels, for example between the rear wheels in the present case.

Figure 3:
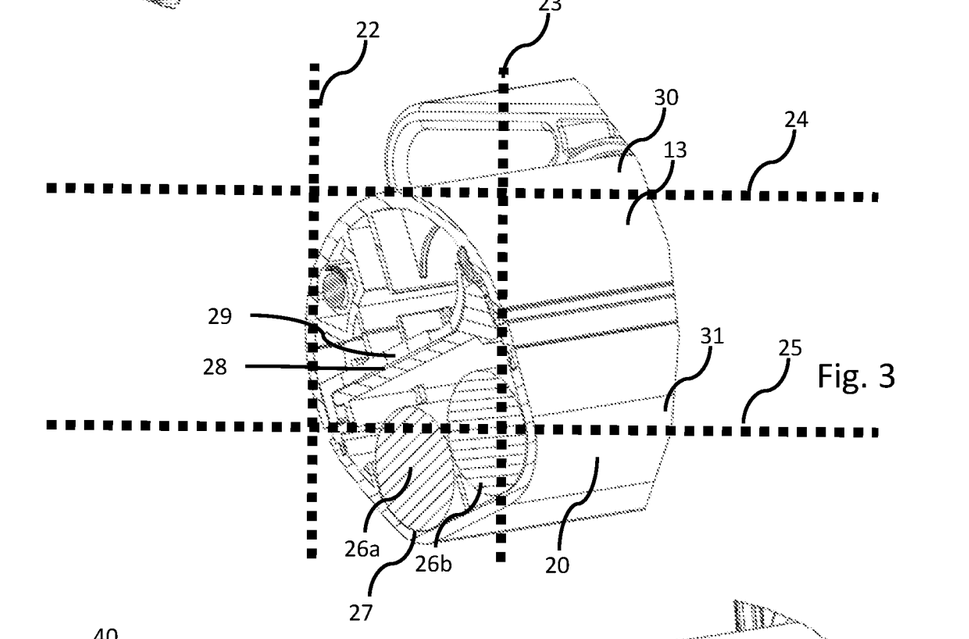
FIG. 3 a section through the part according to FIG. 2.

To explain the position of the battery module 20, reference is made below to various planes illustrated with reference to FIG. 3 (with corresponding lines intended to symbolize or illustrate these planes). A first vertical plane is indicated in FIG. 3 by a line, which in turn is indicated by reference sign 22. A second vertical plane is analogously marked by a line with the reference sign 23. A first horizontal plane is marked analogously by a line with reference sign 24. A second horizontal plane is correspondingly marked with the reference sign 25. The first vertical plane 22 is tangent to the rear wheel axle 13 from the outside or, in the present case, from the rear. The second vertical plane 23 is tangent to the rear wheel axle 13 correspondingly from the inside or, in the present case, from the outside. The first horizontal plane 24 is tangent to the rear wheel axle 13 from above. The second horizontal plane 25 is tangent to the rear wheel axle 13 from below. In this context, an operating state of the stroller frame is to be assumed.

As can be seen from FIG. 3, the battery module 20 is arranged at least predominantly (directly) below the rear wheel axle 13 (however, sections of the battery module 20 are also arranged not below the rear wheel axle 13, in particular if the rear wheel axle 13 is regarded as an umbrella and the area below the rear wheel axle 13 is regarded as the area protected by the umbrella in case of vertically falling water drops). In other words, the battery module 20 is arranged predominantly (in the sense of more than 50% by weight and/or at least 50% by volume) between the first vertical plane 22 and the second vertical plane 23, and to a lesser extent inside the second vertical plane 23.

Furthermore, the battery module 20 is completely below a level of the first horizontal plane 24 and partly, in particular predominantly (again in the sense of with more than 50 wt. % and/or at least 50 vol. %) below a level of the second horizontal plane 25.

In FIG. 3, also batteries 26a, 26b are visible within a housing 27 of the battery module 20. The battery module 20 (or its housing 27) has a battery module flat side 28, which (in the assembled state) correspondingly bears against a wheel connecting device flat side 29. By means of this contact, in a simple manner mechanical contacting or joining of the battery module 20 and the wheel connecting device (here rear wheel axle 13) can be achieved. Furthermore, it can be seen in FIG. 3 that the rear wheel axle 13 in the cross-section shown here is at least substantially semicircular in shape or has a free wall 30 which runs in an arcuate shape (in particular circular). The free wall 30 does not comprise any corners or edges.

Similarly, also a free wall 31 (in the assembled state) of the battery module 20 preferably comprises no corners or edges. Specifically, this free wall 31 may also form an arc in cross-section (but possibly not circular). In the case of a deviation from the arcuate shape or in the case of a formation of (rounded) corners, several batteries 26a, 26b can be inserted particularly effectively.

Figure 4:
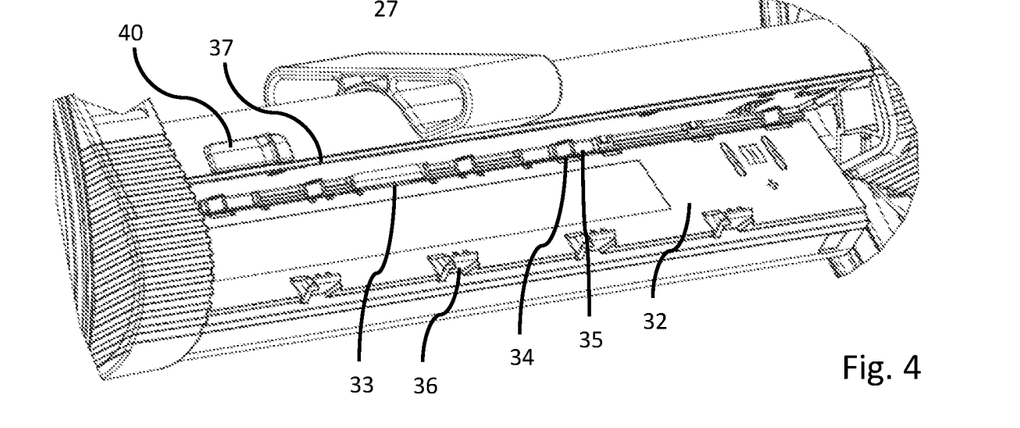
FIG. 4 a view analogous to FIG. 2 with the battery folded down.

FIG. 4 shows a view analogous to FIG. 2, but with battery module 20 shown folded down for illustration purposes, so that a (wedge-shaped) opening 32 is formed between battery module 20 and rear wheel axle 13. In this position, the battery module is no longer held (although this could alternatively be the case) and would fall down unless, for example, a person holds the battery module. Thus, the (exemplary) attachment of the battery module 20 to the rear wheel axle 13 (in general: wheel connecting device) can be seen. At an inner (pointed) end 33 of the opening 32, a retaining device 34, in particular comprising a hook, of the battery module 20 engages a corresponding mating structure 35 (in general: at least one mating structure) of the rear wheel axle 13. At an outer edge of the opening 32 forming in FIG. 4, further engagement elements 36 (in general: at least one engagement element 36) are provided on the battery module 20. Via these engagement elements 36, the battery module 20 can be brought into (latching) engagement with the rear wheel axle 13. For this purpose, the battery module 20 can be folded from the position according to FIG. 4 towards the rear wheel axle 13.

Corresponding mating structures (generally: at least one mating structure) on the rear wheel axle 13 for the engagement elements 36 cannot be seen in detail in FIG. 4, but can be located at the reference sign 37 (for example). These mating structures 37 are preferably spring-loaded and/or can be displaced to secure the battery module 20 (via the engagement elements 36, in particular via a corresponding ramp thereof). Furthermore, the mating structures 37 can be disengaged from the engagement elements 36 by an actuating device 40, so that a locking is released. The actuating device 40 can specifically be designed as a slide (alternatively or additionally as a push element, for example a push button, a pull element and/or a lever).

Figure 5:
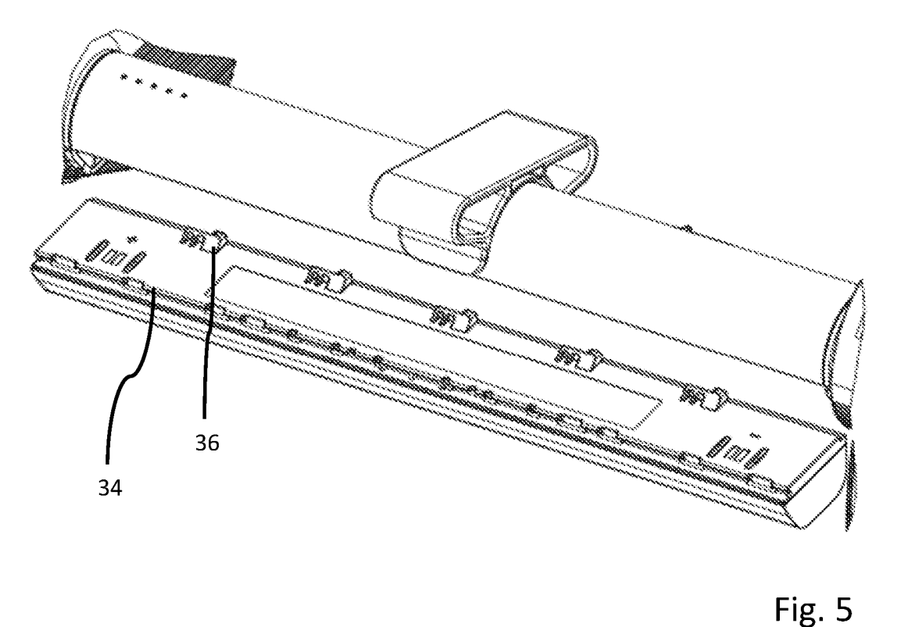
FIG. 5 another oblique view of the part according to FIG. 2 with battery fully detached.
Figure 6:
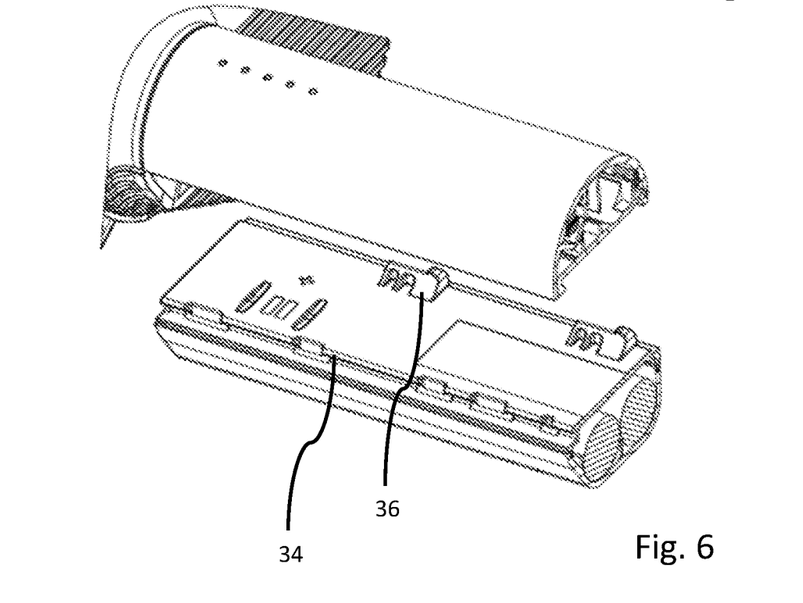
FIG. 6 a section through the part according to FIG. 5.

In the illustrations according to FIGS. 5 and 6, the engagement elements 36 and the retaining device (hook) 34 are once again visible (but from an entirely different direction compared to FIG. 4).

At this point, it should be noted that all of the parts described above, taken on their own and in any combination, in particular the details shown in the drawings, are claimed to be essential to the invention. Modifications thereof are familiar to those skilled in the art. In particular, it should be noted that all the explanations concerning the rear wheel axle 13 apply generally to a wheel connecting device.

REFERENCE SIGNS 10 stroller frame
11 receiving device
12a holding device
12b holding device
13 rear wheel strut, in particular rear wheel axle
14 front wheel strut
15a rear wheel
15b rear wheel
16a front wheel
16b front wheel
17a end
17b end
18a electric motor
18b electric motor
19 strut
20 grab rail
21 grab handle
22 first vertical plane
23 second vertical plane
24 first horizontal plane
25 second horizontal plane
26a battery
26b battery
27 housing
28 battery module flat side
29 wheel connecting device-flat side
30 free wall
31 free wall
32 opening
33 end
34 retaining device
35 mating structure
36 engagement element
37 counter structure
40 actuating device
41 actuating device

The invention claimed is:

1. A stroller frame, comprising:
   at least one electric motor, for assistively driving the stroller frame,
   a first wheel on a first side of the stroller frame,
   a second wheel on a second side of the stroller frame,
   at least one wheel connecting device directly connecting the first wheel to the second wheel and
   at least one battery module which is connected or can be connected to the at least one wheel connecting device and in an assembled state is arranged at least partly outside the at least one wheel connecting device and at least predominantly, below a level of an upper end of the at least one wheel connecting device or is arranged at least partly below the at least one wheel connecting device;
   wherein, in the assembled state, outer surfaces of the at least one wheel connecting device and of the at least one battery module at least partly merge; and
   wherein the at least one battery module extends over at least half of a wheel distance between the first wheel and the second wheel directly connected by the at least one wheel connecting device.

2. The stroller frame according to claim 1, comprising:
   wherein the at least one battery module has a height or a diameter which is at most 1.5 times as large as a height or a diameter of the at least one wheel connecting device.

3. The stroller frame according to claim 1,
   wherein the at least one battery module in the assembled state is arranged on an inner side, which also comprises a center of the stroller frame, of a first vertical plane which extends perpendicular to a horizontal plane and perpendicular to a direction of travel and has an outer end of the at least one wheel connecting device, or is arranged such that a projection of the at least one battery module onto the first vertical plane overlaps at least in sections with a projection of the at least one wheel connecting device onto the first vertical plane.

4. The stroller frame according to claim 1, wherein the at least one battery module is removable from the at least one wheel connecting device by means of a tool or manually.

5. The stroller frame according to claim 1, wherein the at least one battery module does not include an electric motor for at least assistively driving the stroller frame.

6. The stroller frame according to claim 1, wherein the at least one battery module in the assembled state when viewed from at least a first angle is predominantly covered by the at least one wheel connecting device, wherein the first angle is greater than 0°, or when viewed from at least a second angle is predominantly not covered by the at least one wheel connecting device.

7. The stroller frame according to claim 1, wherein an edge section of a cross section of the at least one wheel connecting device which in the assembled state does not bear against the at least one battery module is rounded, in particular formed at least approximately arcuate, or an edge section of a cross section of the at least one battery module which in the assembled state does not bear against the at least one wheel connecting device is rounded, in particular formed at least approximately arcuate, optionally with rounded corner regions or without rounded corner regions.

8. The stroller frame according to claim 1, wherein a positioning aid is provided on a flat side of the at least one wheel connecting device.

9. The stroller frame according to claim 1, comprising: an actuating device to be actuated by foot, which actuating device is arranged on the at least one wheel connecting device or not on the at least one battery module.

10. The stroller frame according to claim 1, comprising: at least one locking device for connecting the at least one wheel connecting device and the at least one battery module to one another.

11. A stroller, comprising the stroller frame according to claim 1.

12. A stroller frame, comprising:
at least one electric motor, for assistively driving the stroller frame,
a first wheel on a first side of the stroller frame,
a second wheel on a second side of the stroller frame,
at least one wheel connecting device, and
at least one battery module which is connected or can be connected to the at least one wheel connecting device and in an assembled state is arranged at least partly outside the at least one wheel connecting device and at least predominantly, below a level of an upper end of the at least one wheel connecting device or is arranged at least partly below the at least one wheel connecting device;
wherein, the at least one battery module is manually removable from the at least one wheel connecting device; and
wherein the at least one battery module extends over at least half of a wheel distance between the first wheel and the second wheel directly connected by the at least one wheel connecting device.

* * * * *

UNITED STATES PATENT AND TRADEMARK OFFICE
CERTIFICATE OF CORRECTION

PATENT NO. : 12,485,948 B2  
APPLICATION NO. : 17/593260  
DATED : December 2, 2025  
INVENTOR(S) : Ralf Holleis Page 1 of 1

It is certified that error appears in the above-identified patent and that said Letters Patent is hereby corrected as shown below:

In the Claims

In Column 10, Line 42, in Claim 1, after "wheel", insert --,--

Signed and Sealed this  
Third Day of February, 2026

John A. Squires  
*Director of the United States Patent and Trademark Office*